US011710068B2

(12) United States Patent
Farchi et al.

(10) Patent No.: US 11,710,068 B2
(45) Date of Patent: Jul. 25, 2023

(54) LABELING A DATASET

(71) Applicant: International Business Machines Corporation, Armonk, NY (US)

(72) Inventors: Eitan Farchi, Pardes Hana (IL); Eliran Roffe, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 16/693,303

(22) Filed: Nov. 24, 2019

(65) Prior Publication Data
US 2021/0158205 A1 May 27, 2021

(51) Int. Cl.
*G06F 17/00* (2019.01)
*G06N 20/00* (2019.01)
*G06F 7/523* (2006.01)
*G06N 5/04* (2023.01)

(52) U.S. Cl.
CPC ............. *G06N 20/00* (2019.01); *G06F 7/523* (2013.01); *G06N 5/04* (2013.01)

(58) Field of Classification Search
CPC ........... G06N 20/00; G06N 5/04; G06F 7/523
USPC ............................................. 706/12, 20, 25
See application file for complete search history.

(56) References Cited

U.S. PATENT DOCUMENTS

| 8,909,564 | B1 * | 12/2014 | Kaplow ................. G06N 20/00 706/12 |
| 10,140,421 | B1 * | 11/2018 | Bernard ............... G06Q 10/103 |
| 10,325,220 | B2 * | 6/2019 | Li .......................... G06N 20/00 |
| 10,354,204 | B2 | 7/2019 | Chen et al. |
| 10,997,466 | B2 * | 5/2021 | Peng ......................... G06T 7/11 |
| 11,138,478 | B2 * | 10/2021 | Liu ...................... G06K 9/6262 |
| 11,138,514 | B2 * | 10/2021 | Hu ......................... G06N 20/00 |
| 11,151,608 | B1 * | 10/2021 | Guo .................. G06Q 30/0255 |
| 2013/0218813 | A1 * | 8/2013 | Rinott .................... G06Q 10/10 706/12 |

(Continued)

FOREIGN PATENT DOCUMENTS

KR         101880628 B1         8/2018

OTHER PUBLICATIONS

Zamacona, 'Reducing Classification Cost through Strategic Annotation Assignment', IEEE, 2013 (Year: 2013).*

(Continued)

*Primary Examiner* — Stephen S Hong
*Assistant Examiner* — Matthew J Ludwig
(74) *Attorney, Agent, or Firm* — Ziv Glazberg

(57) ABSTRACT

A method, system and computer program product, the method comprising: obtaining a first model trained upon cases and labels, the first model providing a prediction in response to an input case; obtaining a second model trained using the cases and indications whether a predictions of the first model are correct, the second model providing a correctness prediction for the first; determining a case for which the second model predicts that the first provides an incorrect prediction; further training the first model also on a first corpus including the case and a label, thereby improving performance of the first model; providing the case to the first model to obtain a first prediction; and further training the second model also on a second corpus including the case and a correctness label, the correctness label being "correct" if the first prediction is equal to the label, thereby improving performance of the second model.

16 Claims, 3 Drawing Sheets

(56) References Cited

U.S. PATENT DOCUMENTS

| | | | |
|---|---|---|---|
| 2018/0114101 A1* | 4/2018 | Desai | G06N 5/04 |
| 2018/0300576 A1 | 10/2018 | Dalyac | |
| 2018/0314971 A1* | 11/2018 | Chen | G06N 20/00 |
| 2019/0073447 A1* | 3/2019 | Guo | G06F 40/30 |
| 2020/0250527 A1* | 8/2020 | Zhao | G06N 7/005 |
| 2020/0334538 A1* | 10/2020 | Meng | G10L 15/183 |
| 2020/0349467 A1* | 11/2020 | Teague | G06F 16/9027 |
| 2021/0073532 A1* | 3/2021 | Torres | G06V 10/764 |
| 2021/0241175 A1* | 8/2021 | Harang | G06N 20/20 |

OTHER PUBLICATIONS

Krizhevsky, 'ImageNet Classification with Deep Convolutional Neural Networks', Advances in Neural Information Processing Systems, 2012 (Year: 2012).*

Culotta, Corrective Feedback and persistent learning for information extraction, Science Direct, 2006 (Year: 2006).*

Nighania, 'Various ways to evaluate a ML model's performance', Towards Data Science, Dec. 30, 2018 (Year: 2018).*

ClusterMap: labeling clusters in large datasets via visualization.

* cited by examiner

LABELING A DATASET

TECHNICAL FIELD

The present disclosure relates to machine learning systems in general, and to a method and apparatus for assigning labels to cases of a data set using limited labeling resources, in particular.

BACKGROUND

Computerized devices control almost every aspect of our life—from writing documents to controlling traffic lights. Within computerized systems, Artificial Intelligence (AI) systems, and in particular Machine Learning (ML) systems are becoming more and more prevalent.

Two main types of machine learning are supervised learning and unsupervised learning.

In unsupervised learning, the machine builds a mathematical model from a set of data which contains only inputs and no desired output. Unsupervised learning algorithms may be used to structure the data, for example by grouping or clustering similar items, thus discovering patterns and important features within the data.

In supervised learning, the machine builds a mathematical model by training upon a set of data records, wherein each such data record contains the inputs and one or more labels indicating the desired outputs, also referred to as "ground truth". For example, a task may be determining whether a woman having certain weight, age, and clinical data, and living in a certain city, has breast cancer or not, and the ground truth may be a formal medical diagnosis of whether the woman indeed has breast cancer. Once trained, the machine then needs to determine the output for a given data set. For example, given the weight, age, city and clinical data of a woman, the machine learning engine after being trained needs to predict whether the woman has breast cancer or not.

Generally, the larger and more representative of the cases that will be presented to the model, the better is the model. An exception is the case of "over fitting", in which the model is trained too well on the specific training set, such that its accuracy on different cases is below an acceptable level.

However, labeling a large number of cases, i.e., obtaining a ground truth for each case, may be a labor and time consuming job. When the resources for labeling a data set are limited, this may pose a problem and disable or postpone the training of an effective model.

BRIEF SUMMARY//WILL BE COMPLETED

One exemplary embodiment of the disclosed subject matter is a computer-implemented method comprising: obtaining a first model trained upon a multiplicity of input cases and a label corresponding to each input case, the first model providing a first prediction in response to an input case; obtaining a second model trained using the multiplicity of input cases and indications of whether a prediction of the first model regarding each of the multiplicity of input cases is correct, the second model providing a correctness prediction of whether the first model provides correct prediction regarding the input case; determining one or more input cases for which the second model predicts that the first model provides an incorrect prediction; further training the first model also on a first corpus including the input cases and corresponding labels for each input case, thereby improving performance of the first model; providing the input cases to the first model to obtain first predictions; and further training the second model also on a second corpus including the input cases and a correctness label for input cases, the correctness label being "correct" if the first prediction is equal to the corresponding label, and "incorrect" otherwise, thereby improving performance of the second model.

Another exemplary embodiment of the disclosed subject matter is a system having a processor, the processor being adapted to perform the steps of: obtaining a first model trained upon a multiplicity of input cases and a label corresponding to each input case, the first model providing a first prediction in response to an input case; obtaining a second model trained using the multiplicity of input cases and indications of whether a prediction of the first model regarding each of the multiplicity of input cases is correct, the second model providing a correctness prediction of whether the first model provides correct prediction regarding the input case; determining one or more input cases for which the second model predicts that the first model provides an incorrect prediction; further training the first model also on a first corpus including the input cases and corresponding labels for each input case, thereby improving performance of the first model; providing the input cases to the first model to obtain first predictions; and further training the second model also on a second corpus including the input cases and a correctness label for input cases, the correctness label being "correct" if the first prediction is equal to the corresponding label, and "incorrect" otherwise, thereby improving performance of the second model.

Yet another exemplary embodiment of the disclosed subject matter is a computer program product comprising a non-transitory computer readable medium retaining program instructions, which instructions when read by a processor, cause the processor to perform: obtaining a first model trained upon a multiplicity of input cases and a label corresponding to each input case, the first model providing a first prediction in response to an input case; obtaining a second model trained using the multiplicity of input cases and indications of whether a prediction of the first model regarding each of the multiplicity of input cases is correct, the second model providing a correctness prediction of whether the first model provides correct prediction regarding the input case; determining one or more input cases for which the second model predicts that the first model provides an incorrect prediction; further training the first model also on a first corpus including the input cases and corresponding labels for each input case, thereby improving performance of the first model; providing the input cases to the first model to obtain first predictions; and further training the second model also on a second corpus including the input cases and a correctness label for input cases, the correctness label being "correct" if the first prediction is equal to the corresponding label, and "incorrect" otherwise, thereby improving performance of the second model.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
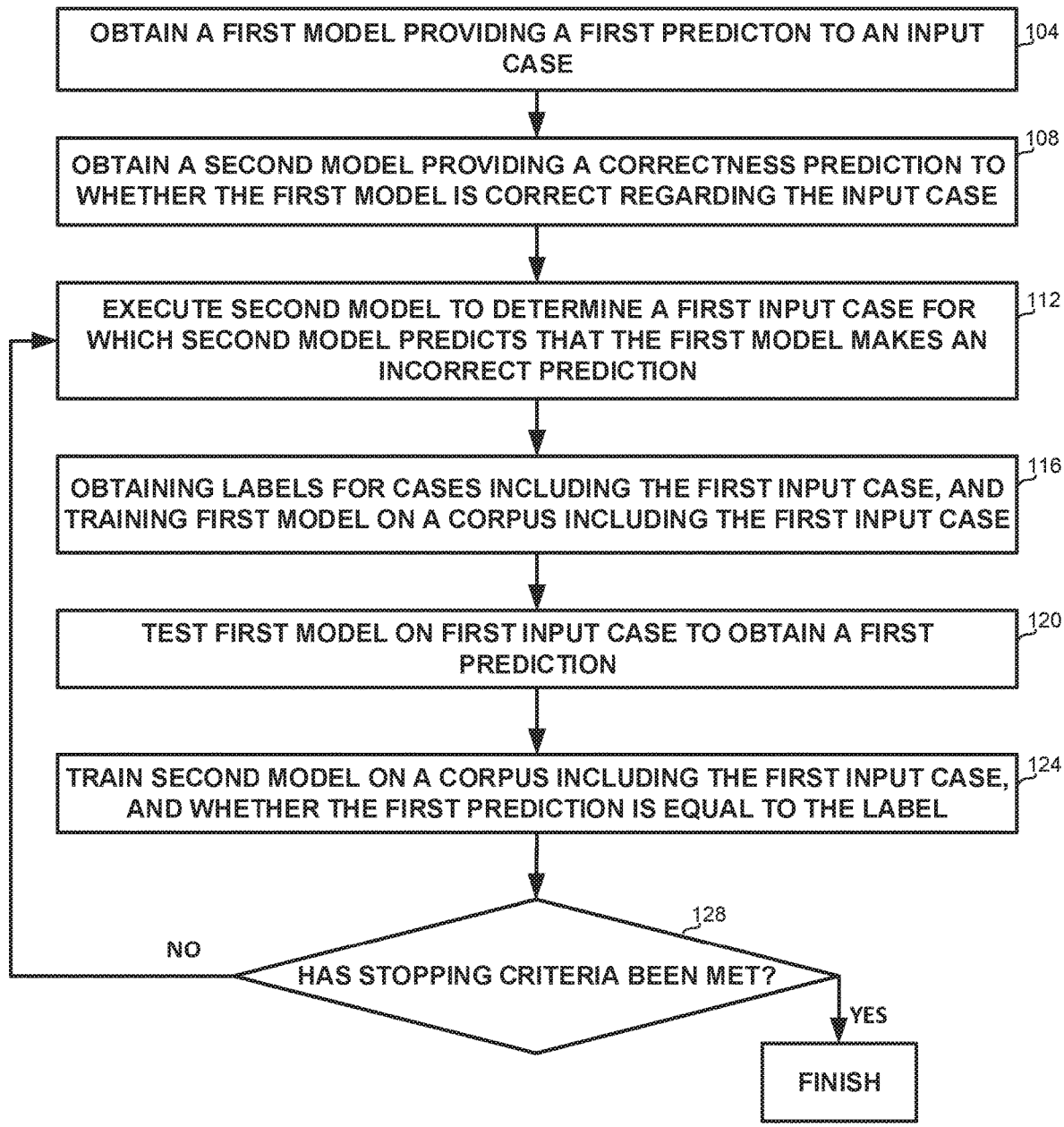
FIG. 1A shows a flowchart diagram of a method for labeling a dataset, in accordance with some exemplary embodiments of the disclosed subject matter.

Machine Learning (ML) systems is a general name for methods, algorithms and devices, also referred to as engines, executed by computers performing specific tasks, while relying on learned patterns or inference rather than explicit instructions. Machine learning algorithms build a mathematical model based on sample data, known as "training data", and use the model to make predictions or decisions without being explicitly programmed to perform the task. Machine learning algorithms are used in more and more areas, including finance, health, agriculture, social studies, science, and others, in a wide variety of applications, especially where it is difficult or infeasible to develop a conventional or explicit algorithm for effectively performing a task. Such applications may include but are not limited to data mining which relates to making predictions based on past cases, computerized vision, filtering items, or the like.

Of particular interest are ML engines based on supervised learning. The operation of an ML engine can generally be described as receiving one or more test cases, s wherein each test case comprises a value for each feature from a collection of features, and providing a prediction for the case. For example, a test case may include the clinical data, age, weight and city of a woman, and the engine may predict whether the woman has breast cancer or not. The features may thus be the age, weight, city, and parameters of the clinical data, such as blood pressure, heart rate, lab measurements, or the like. Each feature may be discrete with a finite or infinite number of values, continuous with or without limits, or the like.

Training such an ML engine requires data records, each comprising of values for the features, and a ground truth, or label for each case.

However, obtaining a large number of cases and the correct answer or answers for each case may consume significant amounts of time and labor. In addition, it may not be known ahead which cases or case types are particularly required for training a model, and which cases may simply train the same areas over and over again, and may be useless or even create over fitting of the model.

Thus, one technical problem is a need to label a dataset in an efficient manner, such that if the resources available for training a data set are limited, the resources are used for training cases that may indeed improve the model.

One technical solution comprises generating or otherwise obtaining a first model and a second model. The first model is trained as required for the specific problem, e.g., upon a collection of cases, each comprised of a value for each of a multiplicity of features, and a label, i.e., a correct response. For example, a case may describe a woman aged 35, weighting 60 kg and living in a northern city, and the label, as assigned by a professional such as a physician may be that the woman has breast cancer.

The second model is trained upon cases such as the cases received by the first model, wherein the label is whether the first model provided a correct prediction to the case. In the example above, if the first model predicted that the woman has breast cancer, the label of the case for the second model would be "correct", and "incorrect" otherwise. The second model is then required to predict, given a case, whether the first model would provide a correct prediction for the case or not.

The two models may be trained, for example using a number of test cases equal to or exceeding a predetermined multiplication, in a non-limiting example between about five and about forty, such as 10, of the number of features of the case. In the example above, if each case comprises an age, a weight, and a city, the number of features is 3, at least 30 cases may be obtained. The first model is trained based on the cases and their labels, i.e., the ground truth indicating whether the woman in each case has breast cancer or not. The first model may then be tested on these cases, and the second model may be trained on the cases, wherein the label of each case is whether the first model provided a prediction equal to the label (i.e., correct) or not (i.e., incorrect).

One or more test cases, not belonging to the training set, may then be determined, for which the second model predicts that the first model would provide a wrong prediction. Ground truth regarding the first model may then be obtained for additional cases, for example randomly selected from the determined test cases. The number of the additional cases upon which the first model is trained may also be the same or different predetermined number of multiplications of the number of features. The first model may then be trained upon the test cases with their respective labels, to enhance its performance. In some embodiments, the first model may be trained on all test cases, the new test cases as well as the test cases upon which the first model has been trained before. In other embodiments, the first model, as previously trained upon the previous cases, may be further trained on the new test cases.

The first model may then be tested upon these cases it has been trained upon, whether only the new test cases or all cases, to obtain predictions. The second model may then be further trained to enhance its performance The second model may be trained upon the test cases, and a label indicating whether the first model provided correct tor incorrect prediction, as compared to the ground truth of these cases. In some embodiments, the second model may be trained on all test cases, the new test cases as well as the test cases upon which the second model has been trained before. In other embodiments, the second model, as previously trained upon the previous cases, may be further trained on the new test cases.

The process may be repeated until the labeling resources for the first model are exhausted, until the performance, i.e. the percentage of correct predictions of the first engine, is satisfactory or does not improve with further iterations, or any other stopping criteria.

It may be believed that once the first model is trained on certain cases, it may always, or almost always, provide correct predictions for these cases. However, this is true mainly in over-fitting situations, which are generally undesired. When the training cases are selected to represent the full corpus, the model may provide incorrect predictions even for cases it has been trained upon.

Another technical solution relates to obtaining or trusting a prediction provided for a test case by the first model, only if the second model predicts that the first model will provide a correct prediction. In situations in which the first model takes a long time to provide a prediction, this may enhance the efficiency, since if the second model predicts that the first model will provide incorrect prediction, the first model may not be provided with this case at all.

One technical effect of the disclosure relates to making efficient usage of the labeling resources for labeling cases for the first model, by repeatedly labeling cases for which the first model is assumed to provide incorrect predictions, thereby improving it, rather than adding cases for which the first model is already correct.

Another technical effect of the disclosure relates to adding a confidence level to the prediction of the first model, without the first model outputting a confidence level. By obtaining or accepting the prediction of the first model only if the second model indicates that the first model provides a correct prediction, the hit ratio of the first model may be increased.

Yet another technical effect of the disclosure relates to saving execution time of the first model, by avoiding executing the first model at all if the second model indicates that it would provide an incorrect prediction.

Yet another technical effect of the disclosure relates to the option to use any first model and improve its performance, without having to change or enhance its behavior. This effect also provides for using first models that do or do not provide a confidence level.

While prior art solutions may depend on a confidence level associated by a model with its prediction, the current disclosure is particularly suitable for models that provide a prediction, but not a confidence level for the prediction, since the predictions of the second model provide "control" over the predictions of the first model. In the example above, the prediction may be that the woman has or has not breast cancer. In another example, in which it is required to identify a drawn digit, the prediction may be any digit between 0 and 9, without a confidence level. In some embodiments, the model may be a classifier and the prediction may be an identifier of one of the classes.

Referring now to FIG. 1A, showing a flowchart diagram of a method labeling a data set, in accordance with some exemplary embodiments of the disclosed subject matter.

On step 104, a first model may be obtained, the first model adapted to receive a case comprising values for a collection of features, and output a prediction for the case. The first model may be retrieved from a storage device, from a database, or the like. Additionally or alternatively, the first model may be trained upon a collection of cases, for example a predetermined multiplication of the number of features, wherein each case comprises values for each feature from the collection of features, and a label.

On step 108, a second model may be obtained, the second model adapted to receive a case comprising values for the same collection of features as the first model, and output a prediction for the case, the prediction indicating whether the first model would provide a correct prediction for the case. The second model may be trained upon the same cases upon which the first model has been trained, but with a different label. Thus, the second model does not predict in runtime the correct answer for any case, but only whether the fist model has made the correct prediction regarding the case. The second model may be retrieved from a storage device, from a database or the like. Additionally or alternatively, the second model may be trained upon the same cases as the first model, each case comprising the values for the collection of features, but instead of a label relevant for the case, each case is associated with a label indicating whether the first model provided a correct prediction for the case or not. Thus, in order to train the second model, the first model is tested upon its training cases. Then for each case the comparison between the prediction of the first model and the ground truth, provides the label for the second model.

On step 112, the second model may be executed upon a multiplicity of cases, to obtain one or more input cases for which the second model predicts that the first model would provide an incorrect prediction. The multiplicity of cases are preferably cases upon which the first and the second models were not trained before. Thus, cases for which the second model predicts that the first model would provide an incorrect prediction, are collected. In an exemplary embodiment, the number of cases may also be at least the predetermined multiplication of the number of features.

On step 116, ground truth may be obtained for the collected cases, or a subset thereof, for example by a human expert labeling the cases. The subset may be selected randomly or in accordance with any other criteria. The first model may then be trained upon the cases. In some embodiments, the first model may be trained on these cases in addition to any cases the first model has previously been trained upon, thus improving its performance. In other embodiments, the first model may be trained from anew upon all cases.

On step 120, the first model may be tested upon the collected cases, to obtain predictions for the cases. The first model may be tested on the cases it was trained upon, whether only the new ones or all cases.

On step 124, ground truth for the second model may be obtained by comparing the prediction of the first model for each case and its label, thus determining whether the first model provided a correct or incorrect prediction. The second model may then be trained upon these cases, with the ground truth indicating whether the first model provided correct or incorrect prediction. In some embodiments, the second model may be trained on these cases in addition to any cases the second model has previously trained upon, thus improving its performance In further embodiments, the second model may be trained from anew upon all cases.

On step 128 it may be determined whether a stopping criteria has been met. One possible stopping criteria is the exhaustion of the resources for labeling the cases for the first model, for example time or human labor resources. Another possible stopping criteria is that the performance of the first case has not improved. The performance may be determined, for example using the labels assigned to the cases for the second model, indicating whether the first model provided correct or incorrect prediction. If the performance has not improved after the latest one, two or another predetermined number of iterations, it may be determined that the stopping criteria has been met.

If the stopping criteria has been met, the process may be finished, otherwise execution may return to step 112 for a further iteration of searching for additional cases to train the models on.

The iterative processing provides for repeatedly training the first model with further cases to improve its performance, while efficiently investing the available resources in cases which indeed contribute and improve the performance rather than selecting random cases which may or may not contribute to the improvement.

Figure 1B:
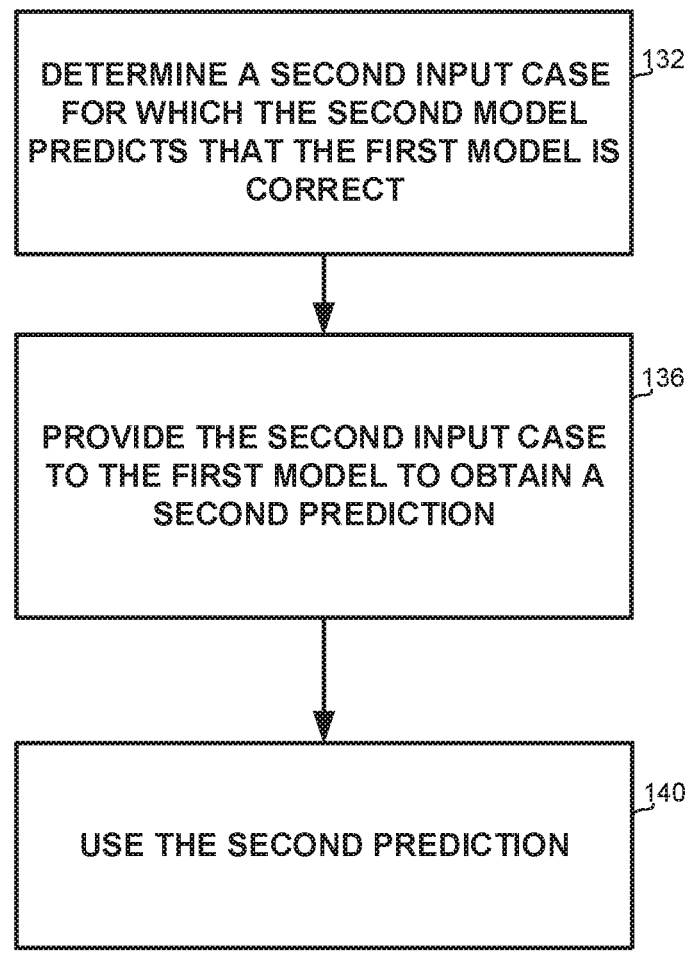
FIG. 1B shows a flowchart diagram of a method for using a model trained upon labeled cases, in accordance with some exemplary embodiments of the disclosed subject matter.

Referring now to FIG. 1B, showing a flowchart of further steps in a method for obtaining and using predictions, in accordance with some exemplary embodiments of the disclosed subject matter.

On step 132, one or more second input cases may be determined, for which the second model predicts that the first model would provide a correct prediction.

On step 136 the first model may be executed upon the one or more second input cases, to obtain corresponding predictions. The predictions are assumed to be correct, since the second model indicated that the first model would yield correct predictions.

Thus, on step 140, the predictions of the first model may be utilized as required.

Thus, the actual required predictions may only be obtained if it is assumed that they are correct, without wasting resources on obtaining predictions that will not be used since they are unlikely to prove correct.

It will be appreciated that the method does not require or use any confidence level provided by the first model an indicating a probability of its prediction being correct. Rather this effect is obtained from the prediction of the second model. Therefore, the disclosure has a significant advantage in cases where the first model does not provide a confidence.

It will also be appreciated that the first model is not affected by the method, such that any existing model or model type can be used without change while its performance may be improved.

Figure 2:
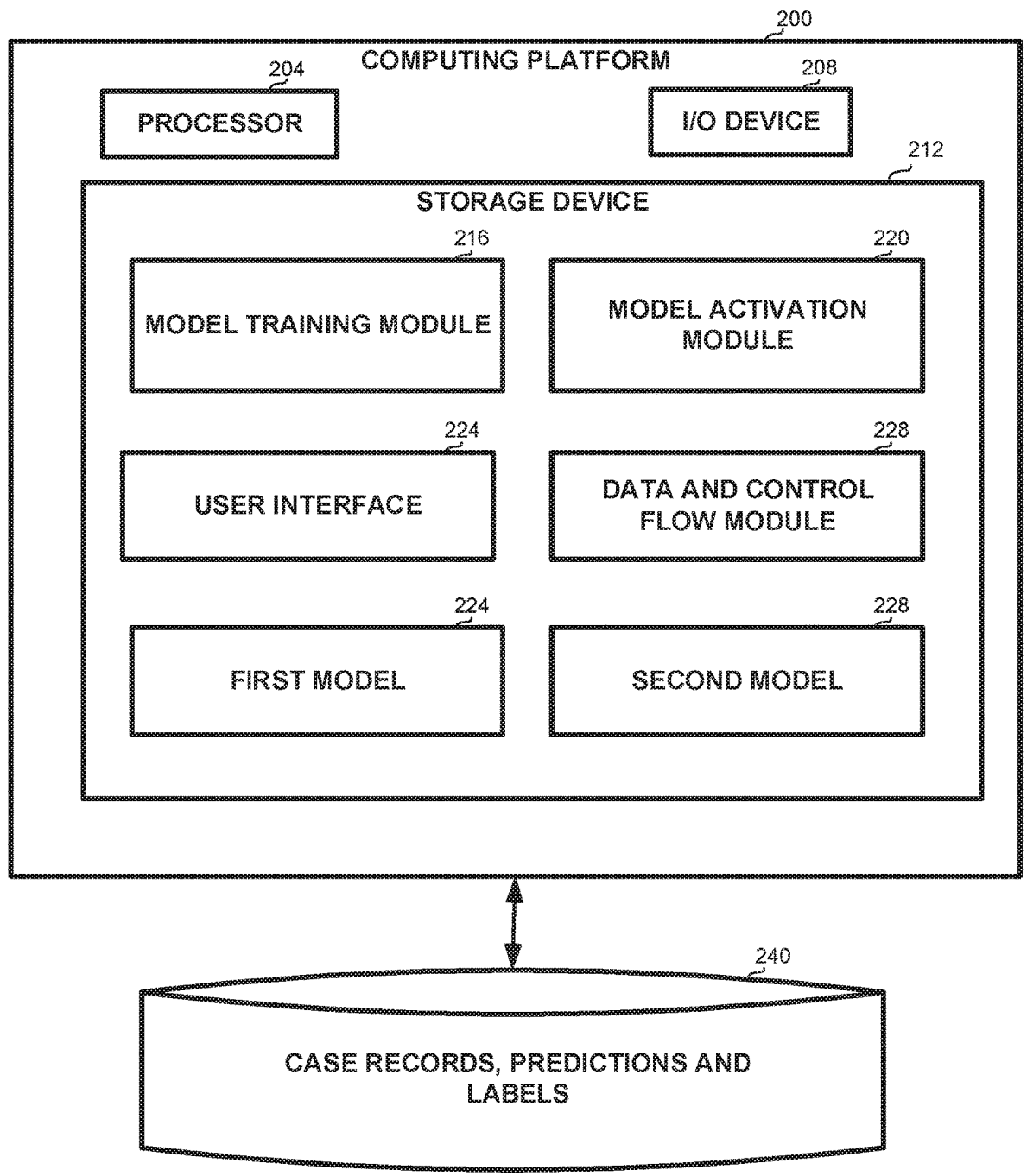
FIG. 2 shows a block diagram of a system configured for labeling a dataset and using a model trained upon the data set, in accordance with some exemplary embodiments of the disclosed subject matter.

Referring now to FIG. 2, showing a block diagram of a system configured for labeling a data set and using predictions, in accordance with some embodiments of the disclosure.

The system may comprise one or more Computing Platforms 200. In some embodiments, Computing Platform 200 may be a server, and may provide services to one or more clients. In further embodiments, Computing Platform 200 may be the same, or one of the computing platform executing tasks for a client.

Computing Platform 200 may communicate with other computing platforms via any communication channel, such as a Wide Area Network, a Local Area Network, intranet, Internet or the like.

Computing Platform 200 may comprise a Processor 204 which may be one or more Central Processing Units (CPU), a microprocessor, an electronic circuit, an Integrated Circuit (IC) or the like. Processor 204 may be configured to provide the required functionality, for example by loading to memory and activating the modules stored on Storage Device 212 detailed below.

It will be appreciated that Computing Platform 200 may be implemented as one or more computing platforms which may be operatively connected to each other. It will also be appreciated that Processor 204 may be implemented as one or more processors, whether located on the same platform or not.

Computing Platform 200 may comprise Input/Output (I/O) Device 208 such as a display, a pointing device, a keyboard, a touch screen, or the like. I/O Device 208 may be utilized to receive input from and provide output to a user, for example receive ground truth for cases regarding the first model from a user, display to the user data such as predictions or performance data, or the like.

Computing Platform 200 may comprise a Storage Device 212, such as a hard disk drive, a Flash disk, a Random Access Memory (RAM), a memory chip, or the like. In some exemplary embodiments, Storage Device 212 may retain program code operative to cause Processor 204 to perform acts associated with any of the modules listed below, or steps of the method of FIG. 1A or FIG. 1B above. The program code may comprise one or more executable units, such as functions, libraries, standalone programs or the like, adapted to execute instructions as detailed below.

Storage Device 212 may comprise Model Training Module 216 for receiving a collection of cases and a ground truth for each case, and training a model on these cases. It will be appreciated that a model may already be trained on one or more cases, and Model Training Module 216 may be adapted to further train it by adding further cases, rather than start the model from scratch, thereby improving the performance of the model.

Storage Device 212 may comprise Model Activation Module 216, for receiving a case comprising values for a multiplicity of features, and based upon a particular training, outputting a prediction. Depending on the implementation, Model Activation Module 216 may receive a model and a case and provide the prediction of the model regarding the case. In further implementations, each model may be associated with its own Model Activation Module 216, such that given a case, it provides a prediction.

Storage Device 212 may comprise First Model 224 and Second Model 228 as may have been initially created and trained or further trained by Model Training Engine 216.

Storage Device 212 may comprise User Interface 224 for displaying data and results to a user, for example receiving ground truth for a case, receiving parameters such as required improvement, displaying predictions or statistics, or the like, using I/O device 208.

Storage Device 212 may comprise Data and Control Flow Module 228 responsible for managing the flow of control between the components detailed above, and for managing the data flow such that each component receives or gets access to the data required for its operation. For example, Data and Control Flow Module 228 may be responsible for activating the second model, determining cases for which the second model predicts that the first model would provide incorrect prediction, obtaining ground truth for these cases regarding the first model, for example by displaying the cases to a user and receiving a label from the user or by extracting a label from a database, training the first model by activating Model Training Module 216, testing the first model on the cases by activating Model Activation Module 216, determining ground truth regarding the second model and training the second model by activating Model Training Module 216.

Computing Platform 200 can comprise or be operatively connected to Database 240, comprising case records, each including the values for the various features, ground truth, e.g. labels regarding the first or the second models for each case, predictions of the first or the second model for each case, or the like.

Depending on the implementation, first model 224 and second model 228 may be data rather than an executable unit, and may thus be stored on database 240 rather than loaded for execution by Processor 204.

It will be appreciated that the module description above is exemplary only, that the modules may be arranged differently, and that the division of tasks between the modules may be different.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a first model trained upon a multiplicity of input cases and a multiplicity of labels corresponding to the multiplicity of input cases, the first model configured to provide a label prediction in response to a first input case of the multiplicity of input cases;
   obtaining a second model trained using the multiplicity of input cases and a respective multiplicity of indications indicating whether label predictions for the multiplicity of input cases that were made by the first model were correct, the label predictions comprising the label prediction, the second model configured to provide a correctness prediction in response to the first input case, the correctness prediction predicting whether executing the first model on the first input case would result with the first model predicting a correct label for the first input case;
   predicting, by the second model, that executing the first model on a second input case would result with the first model predicting an incorrect label for the second input case, the multiplicity of input cases excluding the second input case;
   collecting a ground truth label for the second input case; and
   retraining the first and second models based on the ground truth label.

2. The method of claim 1, wherein each input case of the multiplicity of input cases comprises a first number of features, and wherein the second input case comprises a predetermined multiplication of the first number of features.

3. The method of claim 2, wherein the predetermined multiplication is between five and forty.

4. The method of claim 1, wherein said retraining comprises: retraining the first model on a first corpus that comprises the second input case and the ground truth label, thereby improving a performance of the first model;
   executing the first model on the second input case to obtain a first prediction; and
   retraining the second model on a second corpus that comprises the second input case and a correctness label for the second input case, the correctness label being "correct" if the first prediction is equal to the ground truth label, and "incorrect" otherwise, therby improving a performance of the second model.

5. The method of claim 4, further comprising:
   predicting, by the second model, that executing the first model on a third input case would result with the first model predicting a correct label for the third input case;
   executing the first model on the third input case to obtain a second prediction; and
   utilizing the second prediction.

6. The method of claim 4, wherein the first model is a classifier and the first prediction is a class identifier.

7. The method of claim 4, wherein the first model does not associate a confidence level with the first prediction.

8. The method of claim 1, further comprising repeating said predicting said collecting, and said retraining until no further improvement in an accuracy measure of the first model is obtained, or until a predetermined number of labels have been assigned to input cases.

9. A system having a processor, the processor being adapted to perform the steps of:
   obtaining a first model trained upon a multiplicity of input cases and a multiplicity of labels corresponding to the multiplicity of input cases, the first model configured to provide a label prediction in response to a first input case of the multiplicity of input cases;
   obtaining a second model trained using the multiplicity of input cases and a respective multiplicity of indications indicating whether label predictions for the multiplicity of input cases taht were made by the first model were correct, the label predictions comprising the label prediction, the second model configured to provide a correctness prediction in response to the first input case, the correctness prediction predicting whether executing the first model on the first input case would result with the first model predicting a correct label for the first input case;
   predicting, by the second model, that executing the first model on a second input case would result with the first model predicting an incorrect label for the second input case, the multiplicity of input cases excluding the second input case;
   collecting a ground truth label for the second input case; and
   retraining the first and second models based on the ground truth label.

10. The system of claim 9, wherein each input case of the multiplicity of input cases comprises a first number of features, and wherein the second input case comprises a predetermined multiplication of the first number of features wherein the predetermined multiplication is between five and forty.

11. The system of claim 9, wherein said retraining comprises:
    retraining the first model on a first corpus that comprises the second input case and the ground truth label, thereby improving a performance of the first model;
    executing the first model on the second input case to obtain a first prediction; and
    retraining the second model on a second corpus that comprises the second input case and a correctness label for the second input case, the correctness label being "correct" if the first prediction is equal to the ground truth label, and "incorrect" otherwise, thereby improving a performance of the second label.

12. The system of claim 11, wherein the first model is a classifier and the first prediction is a class identifier.

13. The system of claim 11, wherein the first model does not associate a confidence level with the first prediction.

14. The system of claim 9, wherein the processor is further adapted to: repeat said predicting, said collecting, and said retraining until a predetermined number of labels have been assigned to input cases.

15. The system of claim 9, wherein the processor is further adapted to: repeat said predicting, said collecting, and said retraining until no further improvement in an accuracy measure of the first model is obtained.

16. A computer program product comprising a non-transitory computer readable medium retaining program instructions, which instructions when read by a processor, cause the processor to perform:
    obtaining a first model trained upon a multiplicity of input cases and a multiplicity of labels corresponding to the multiplicity of input cases, the first model configured to provide a label a prediction in response to a first input case of the multiplicity of the input cases;

obtaining a second model trained using the multiplicity of input cases and a respective multiplicity of indications indicating whether label predictions for the multiplicity of input cases that were made by the first model were correct, the label predictions comprising the label prediction, the second model configured to provide a correctness prediction in response to the first input case, the correctness prediction predicting whether executing the first model on the first input case would result with the first model predicting a correct label for the first input case;

predicting, by the second model, that executing the first model on a second input case would result with the first model predicting an incorrect label for the second input case, the multiplicity of input cases excluding the second input case;

collecting a ground truth label for the second input case; and retraining the first and second models based on the ground truth label.

\* \* \* \* \*